(12) United States Patent
Rival et al.

(10) Patent No.: US 10,522,310 B2
(45) Date of Patent: Dec. 31, 2019

(54) EXTINGUISHING GAS FILTERING DEVICE AND ELECTRIC CURRENT SWITCHGEAR COMPRISING SUCH A FILTERING DEVICE

(71) Applicant: Schneider Electric Industries SAS, Rueil Malmaison (FR)

(72) Inventors: Marc Rival, Bernin (FR); Cyril Domenech, Proveysieux (FR); Daniel Rota, Vif (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 16/038,741

(22) Filed: Jul. 18, 2018

(65) Prior Publication Data
US 2019/0035580 A1    Jan. 31, 2019

(30) Foreign Application Priority Data
Jul. 26, 2017  (FR) ...................... 17 57104

(51) Int. Cl.
*H01H 9/34*    (2006.01)
*H01H 33/53*   (2006.01)
(Continued)

(52) U.S. Cl.
CPC ......... *H01H 33/74* (2013.01); *B01D 39/2051* (2013.01); *B01D 46/12* (2013.01);
(Continued)

(58) Field of Classification Search
CPC .......... H01H 9/30; H01H 9/342; H01H 73/18; H01H 33/53; H01H 33/74; B01D 39/2051;
(Continued)

(56) References Cited

U.S. PATENT DOCUMENTS 3,621,169 A * 11/1971 Eldon .................... H01H 33/58
                                                                218/152
5,889,249 A *  3/1999 Rival ..................... H01H 9/342
                                                                218/149
(Continued)

FOREIGN PATENT DOCUMENTS

CN      102129924 A      7/2011
DE  10 2007 028 204 A1  12/2008
(Continued)

OTHER PUBLICATIONS

Translation of CN102129924 (Original document published Jul. 20, 2011) (Year: 2011).*
(Continued)

*Primary Examiner* — Edwin A. Leon
*Assistant Examiner* — William A Bolton
(74) *Attorney, Agent, or Firm* — Oblon, McClelland, Maier & Neustadt, L.L.P.

(57) ABSTRACT

An extinguishing gas filtering device for an electric current switchgear with separable contacts, including an electric arc extinguishing chamber, includes, assembled together an inlet part for the extinguishing gases, made of a metal material and including an inlet aperture intended to be fluidically connected with an extinguishing gas outlet of the switchgear; an outlet aperture; a flared wall extending between the inlet and outlet apertures; a gas diffuser, which covers the outlet aperture, being planar in shape and including through-apertures; a filter made of porous metal foam, placed at the output of the gas diffuser.

10 Claims, 4 Drawing Sheets

(51) Int. Cl.
*H01H 33/74* (2006.01)
*B01D 39/20* (2006.01)
*B01D 46/12* (2006.01)
*B01D 46/54* (2006.01)

(52) U.S. Cl.
CPC ........... *B01D 46/543* (2013.01); *H01H 9/342* (2013.01); *H01H 33/53* (2013.01); *B01D 2267/40* (2013.01)

(58) Field of Classification Search
CPC .. B01D 46/12; B01D 46/543; B01D 2267/40; B01B 46/0032; B01B 46/10
USPC ........... 218/52, 34, 35, 43, 81; 335/201, 202
See application file for complete search history.

(56) References Cited

U.S. PATENT DOCUMENTS

| | | | | |
|---|---|---|---|---|
| 6,784,393 B2* | 8/2004 | Bach | ...................... | H01H 9/342 218/153 |
| 7,176,771 B2* | 2/2007 | Faber | ..................... | H01H 9/342 335/201 |
| 7,488,915 B2* | 2/2009 | Pollitt | .................... | H01H 9/342 218/149 |
| 7,705,263 B2* | 4/2010 | Rane | ........................ | H01H 9/34 218/149 |
| 2010/0170876 A1* | 7/2010 | Bach | ...................... | H01H 9/342 218/157 |
| 2015/0136740 A1* | 5/2015 | Afshari | .................. | H01H 33/08 218/149 |

FOREIGN PATENT DOCUMENTS

| | | |
|---|---|---|
| EP | 1 298 687 A2 | 4/2003 |
| GB | 2 152 755 A | 8/1985 |

OTHER PUBLICATIONS

French Preliminary Search Report dated Mar. 15, 2018 in French Application 17 57104, filed on Jul. 26, 2017 (with English Translation of Categories of cited documents and Written Opinion).

* cited by examiner

EXTINGUISHING GAS FILTERING DEVICE AND ELECTRIC CURRENT SWITCHGEAR COMPRISING SUCH A FILTERING DEVICE

The present invention relates to an extinguishing gas filtering device for an electric current switchgear. The invention also relates to an electric current switchgear comprising such a filtering device.

Electrical units, such as circuit breakers or contactors, are known and make it possible to selectively interrupt the flow of an electric current within an electrical circuit, for example within an electrical distribution network for domestic or industrial use.

This switchgear includes separable electrical contacts connected to input and output terminals for an electric current. These electrical contacts are selectively moveable between a closed position, in which they allow the electric current to flow between the terminals and, alternatively, an open position in which they are separated from one another so as to prevent this electric current from flowing.

It is known in particular that, when these electrical contacts are moved to their open position when an electric current is flowing therein, an electric arc may form between these two electrical contacts. This electric arc ionizes the ambient air in the switchgear, thereby generating gases, termed extinguishing gases, that are then released to the outside of the switchgear. The electric arc is then extinguished by way of an arc extinguishing chamber within the switchgear, so as to interrupt the flow of the electric current.

The extinguishing gases exhibit a high temperature, typically greater than 4000° C., and comprise particles such as soot that generally stem from partial melting of various internal components of the switchgear under the action of the electric arc.

The extinguishing gas therefore has to be cooled and deionized, by way of a dedicated filtering device of the switchgear, before being released to the outside. This makes it possible in particular to avoid the electric arc current looping back outside the switchgear, for example between the input and/or output terminals and external metal parts, for example within an electrical switchboard, on account of the high electrical conductivity of the ionized extinguishing gas. Such looping back leads to the formation of a short circuit, causing an unacceptable and dangerous safety breach.

There are filtering devices that aim to cool the extinguishing gases before they leave. However, these known filtering devices do not make it possible, in addition to reducing the temperature, to reduce the pressure of the extinguishing gases when they escape.

Now, the pressure increase generated during short circuits by switchgear, in particular upon the interruption of currents exhibiting a high power, poses a safety problem in particular when this switchgear is installed in a confined area, such as an electrical enclosure or an electrical panel. In this case, the excess pressure may seriously damage the electrical switchgear and elements situated around it.

It is these drawbacks that the invention intends more particularly to rectify, by proposing an extinguishing gas filtering device for an electric current electrical switchgear with air switching, this filtering device making it possible, in a satisfactory manner, to reduce the temperature of the extinguishing gases generated by this electrical switchgear while at the same time limiting the pressure of the extinguishing gases.

To this end, the invention relates to an extinguishing gas filtering device for an electric current switchgear with separable contacts and including an electric arc extinguishing chamber, this filtering device including, assembled together:
  an inlet part for the extinguishing gases, this inlet part being made of a metal material and including:
    an inlet aperture intended to be fluidically connected with an extinguishing gas outlet of an electric current switchgear,
    an outlet aperture, and
    at least one flared wall extending between the inlet and outlet apertures;
  a gas diffuser, which covers the outlet aperture of the inlet part, this gas diffuser being planar in shape and comprising through-apertures;
  a filter made of porous metal foam, placed at the output of the gas diffuser.

By virtue of the invention, the use of an inlet part made of a metal material with flared walls makes it possible to channel the jet of extinguishing gas when it leaves the extinguishing chamber. On account of the fact that the part is made of a metal material, and not of plastic, the ablation of material caused by the jet of gas when it passes into the inlet part generates less gas than in known filtering devices made of plastic, thereby limiting the increase in the pressure of the extinguishing gases.

The diffuser makes it possible to distribute the entering extinguishing gas flow over the entire surface area of the filter, thereby increasing the effectiveness of the filtering provided by the latter and preventing the jet of gas from being concentrated locally, which could pierce the filter. Lastly, as the filter is made of metal foam, it provides significant cooling while at the same time occupying a low volume, on account of the high porosity of the metal foam.

Thus, the combination of the inlet part, the gas diffuser and the filter makes it possible to cool the extinguishing gas by absorbing a large amount of energy from the latter, while at the same time limiting the pressure increase, all with a compact architecture.

According to some advantageous but non-mandatory aspects of the invention, such a filtering device may incorporate one or more of the following features, either alone or in any technically permissible combination:
  The inlet part includes an additional inlet aperture that is intended to be connected fluidically to an output of an extinguishing chamber, at least one of the walls of the inlet part extending from this additional inlet aperture to the outlet aperture.
  The gas diffuser includes a membrane of wire cloth.
  The wire cloth membrane is a weave cloth made of stainless steel formed by weaving metal strands with a diameter greater than or equal to 1 mm.
  The gas diffuser includes an assembly of perforated metal plates.
  The metal foam of the filter has a porosity greater than or equal to 90%.
  The metal foam of the filter is made of nickel or of nickel-chromium alloy.
  The inlet part is made of stainless steel or of nickel-plated steel.

According to another aspect, the invention relates to an electric current switchgear, this switchgear comprising:
  a cutoff block containing:
    separable electrical contacts connected to input and output terminals for an electric current and
    an electric arc extinguishing chamber, for extinguishing an electric arc formed upon the separation of the separable electrical contacts, this extinguishing chamber being linked fluidically to an extinguishing gas outlet of the switchgear;

an extinguishing gas filtering device connected fluidically to the extinguishing gas outlet;

the switchgear being characterized in that the filtering device is in accordance with what is described above.

According to some advantageous but non-mandatory aspects of the invention, such a switchgear may incorporate the following feature: the cutoff block includes a second extinguishing chamber comprising a second extinguishing gas outlet, the switchgear comprising a second filtering device positioned at the output of the second outlet, the first and second filtering devices being identical to one another, the inlet aperture of said filtering device being connected fluidically to said extinguishing gas outlet, the additional inlet aperture of the second filtering device being connected fluidically to said second extinguishing gas outlet.

Figure 1:
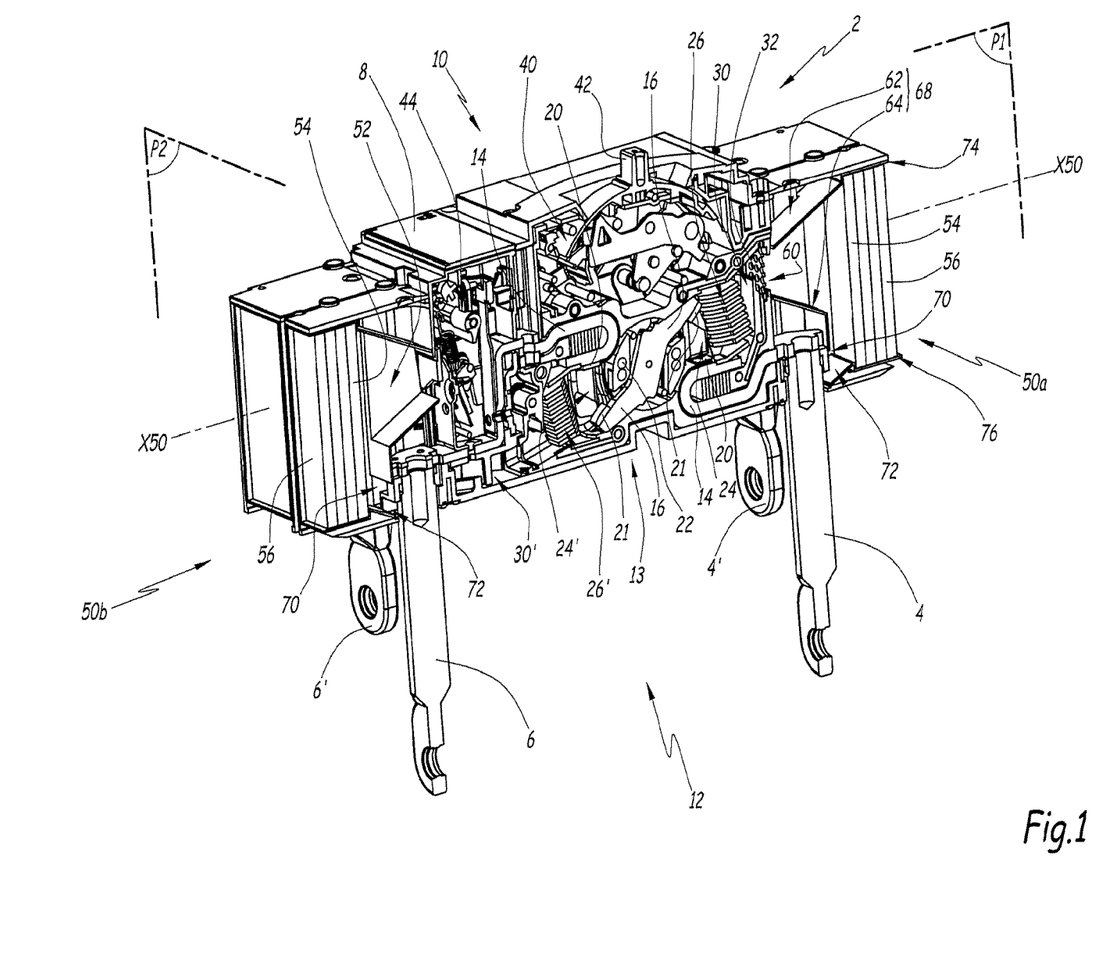
FIG. 1 is a schematic depiction, in a perspective view of a longitudinal section, of an electric current switchgear including an extinguishing gas filtering device according to the invention.
Figure 2:
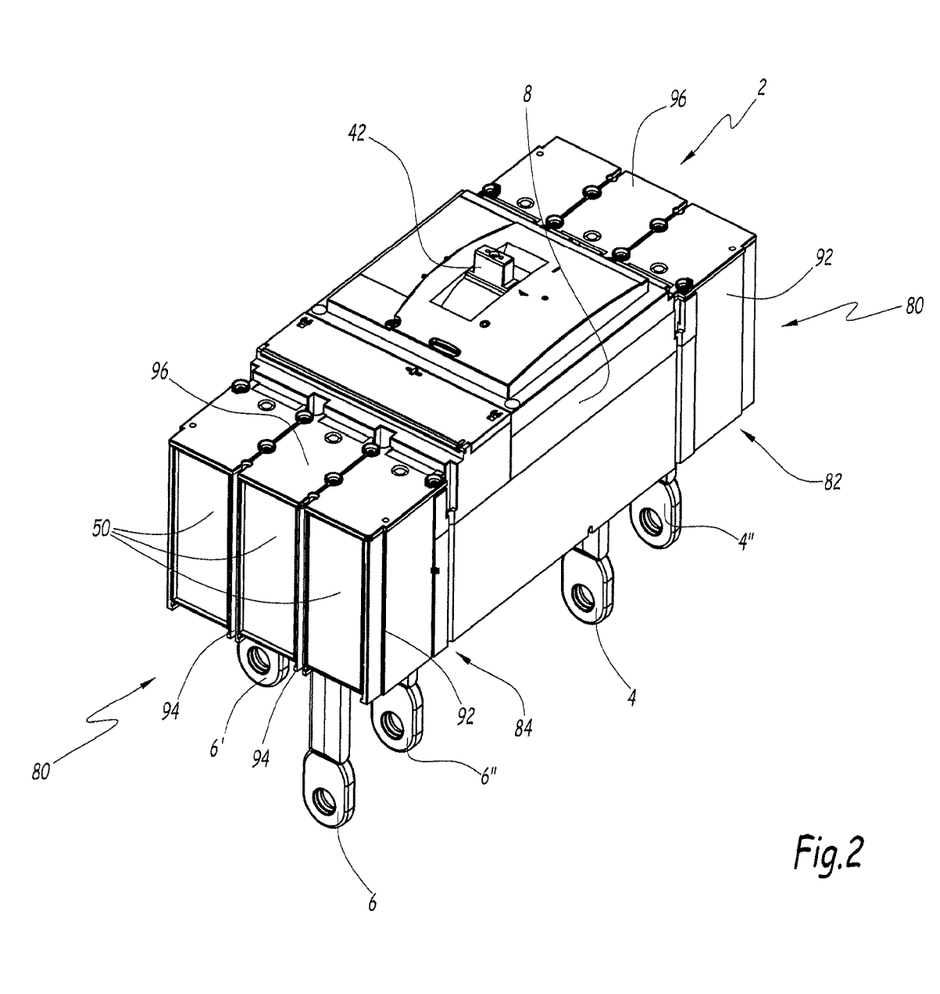
FIG. 2 is a schematic depiction, in an external and perspective view, of the switchgear of FIG. 1.

The invention will be better understood and other advantages thereof will become more clearly apparent in the light of the following description of one embodiment of an extinguishing gas filtering device given solely by way of example and with reference to the appended drawings, in which:

FIGS. 1 and 2 show a switchgear 2 for an electric current with separable electrical contacts and with air switching.

In this example, the switchgear 2 is a low-voltage and high-current multipolar circuit breaker. For example, the switchgear 2 is designed to operate with electric voltages lower than or equal to 1000 volts AC and 1500 volts DC, and with electric currents having a short-circuit intensity of higher than or equal to 1 kA.

The switchgear 2 is in this case designed to act on a three-phase current and, to this end, includes three separate poles, each associated with one phase of the electric current.

As a variant, the switchgear 2 may be different. It may be for example a contactor or a DC circuit breaker. The switchgear may also include a different number of poles, and for example be a unipolar or tetrapolar switchgear.

The switchgear 2 is intended to be connected to an electrical circuit in order to protect it against electrical faults, such as a short circuit or an overcurrent.

To this end, the switchgear 2 includes what are termed upstream connection terminals 4, 4' and 4", each associated with one phase of the electric current. Likewise, the switchgear 2 includes what are termed downstream connection terminals 6, 6' and 6". These upstream and downstream connection terminals in this case extend in a manner projecting from a rear face 12 of a housing 8 of the switchgear 2, this rear face 12 being opposite a front face 10 of the housing 8 of the switchgear 2.

'P1' is used in this case to denote a longitudinal geometrical plane of the switchgear 2.

As illustrated in FIG. 1, the switchgear 2 includes a cutoff block 13, also called cutoff module, containing separable electrical contacts. These separable electrical contacts are in this case formed by associating fixed electrical contacts 14, joined to a frame of the switchgear 2, and mobile electrical contacts 16 that are moveable with respect to the fixed contacts 14, between an open state and a closed state. In FIG. 1, the contacts 14 and 16 are illustrated in the open state.

In this example, the cutoff block 13 is associated with one of the phases of the current and is associated with the terminals 4 and 6.

The switchgear 2 in this case includes other cutoff blocks, each associated with one of the other electrical phases and each including separable electrical contacts. These cutoff blocks are preferably housed in separate compartments of the housing 8. The structure and the function of these cutoff blocks and of their separable contacts are similar to those of the cutoff block 13, such that the description given hereinafter also applies thereto. For example, the switchgear 2 includes two other cutoff blocks respectively associated with the two other phases of the electric current and with the terminals 4' and 6', 4" and 6".

In the closed state, the mobile contacts 16 are in electrical contact with the fixed contacts 14 and thus allow an electric current to flow within the switchgear 2 between the opposite terminals 4 and 6. In the open state, the mobile contacts 16 are spaced apart from the fixed contacts 14 so as to prevent the flow of an electric current, the contacts 14 and 16 thus being electrically isolated by the ambient air. The electric current is thus prevented from flowing between the opposite terminals 4 and 6, at least when there is no electric arc present.

The fixed contacts 14 and the mobile contacts 16 in this case bear contact tabs, respectively denoted 20 and 21 and in this case made of copper, that are intended to promote better electrical conductivity between the contacts 14 and 16 when they are in the closed state.

In the present case, there are two fixed contacts 14, one being connected electrically to the terminal 4 and the other being connected to the terminal 6. The mobile contacts 16 are connected electrically to one another. In this case, there are two of them, each being associated with a fixed contact 14.

In this illustrative example, the mobile contacts 16 are formed by a single part made of an electrically conductive material, which is borne by a rotary unit 22 mounted so as to rotate with respect to the housing 8. The fixed contacts 14 are in this case positioned symmetrically about the axis of rotation of the unit 22.

In a known manner, when two electrical contacts 14 and 16 separate while an electric current is flowing through the switchgear 2, an electric arc occurs between these contacts 14 and 16, for example between the corresponding tabs 20 and 21. This electric arc stems from the breakage in isolation in the air between the contacts 14 and 16 and is maintained by ionization of the ambient air. This results in an increase in temperature and in pressure, as the electric arc in turn brings about the ionization of components of the switchgear 2, for example the ionization of the contact tabs 20, 21 and/or of the walls of the housing 8, thereby giving rise to an extinguishing gas. The electric arc is thus accompanied by a sharp increase in temperature and in pressure inside the switchgear 2.

By way of illustrative example, for a circuit breaker operating at a voltage of 690 V and a cutoff current equal to 100 kA, the energy of the electric arc may reach up to 100 kJ. The extinguishing gas pressure may reach up to 30 bar. In the absence of a filtering device, the extinguishing gas is released outside the housing 8 at a temperature higher than 4000° C. and a sonic speed greater than 300 m/s.

The switchgear 2 also includes arc extinguishing chambers 24 and 24', the role of which is to extinguish such an electric arc. Each extinguishing chamber 24, 24' is thus, in this example, associated with and placed facing a zone of contact between a fixed contact 14 and a mobile contact 16. For example, the extinguishing chamber 24 is associated with the electrical contacts 14 and 16 that are on the side of the upstream terminal 4, and the extinguishing chamber 24' is associated with the electrical contacts 14 and 16 that are on the side of the downstream terminal 6.

The extinguishing chamber 24 includes a stack of sheets 26, also called arc separation plates, and an extinguishing gas evacuation channel 30 that opens out outside the housing 8 of the switchgear 2 at a gas escape outlet. The role of the plates of the stack 26 is to extinguish the electric arc by splitting it into a plurality of separate arcs between the plates. The role of the evacuation channel 30 is to evacuate the extinguishing gas out of the housing of the switchgear 2 towards the corresponding gas outlet.

The evacuation channel 30 in this case includes a protective grating 32 so as to prevent the entry of foreign bodies into the extinguishing chamber 24, for example so as to ensure sealtightness against dust and/or against foreign bodies with a diameter greater than 1 mm. This grating 32 may be omitted, however.

In practice, the extinguishing gases coming from this extinguishing chamber 24 are in this case only able to escape out of the switchgear 2 by way of the channel 30. For example, the housing 8 is made of a gastight material.

As a variant, the cutoff block 13 may include a different number of extinguishing chambers. The number of extinguishing chambers is in this case chosen depending on the number and on the position of the fixed 14 and mobile 16 contacts forming these separable contacts. For example, the switchgear 2 may include just one extinguishing chamber when it includes just one fixed contact 14 and one mobile contact 16 that are associated with this electrical phase.

The extinguishing chambers 24 and 24' are similar in this case. In particular, the extinguishing chamber 24' in particular includes a stack 26' and an evacuation channel 30' that are analogous to the stack 26 and to the evacuation channel 30, respectively. In this example, the chambers 24 and 24" differ from one another in particular in terms of their position within the cutoff block and in terms of the spatial configuration of the channels 30 and 30', as described hereinafter.

In this example, the channels 30 and 30' open out outside the housing 8 each by way of an outlet, such as one or more orifices or apertures, situated on a face, respectively upper and lower, of the housing 8.

The movement of the mobile electrical contacts 16 with respect to the fixed contacts 14 is ensured by way of a control mechanism 40, which is not described in greater detail hereinafter. This control mechanism 40 is in this case able to be actuated manually by an operator, by way of a control lever 42 situated on the front face 10 of the switchgear 2. The mechanism 40 is also able to be actuated automatically, for example in the event of an electrical fault detected by way of a tripping device 44 integrated into the switchgear 2. For example, the tripping device 44 is a thermal and/or magnetic trip.

In this example, the mechanism 40 is designed to control the simultaneous movement of the mobile electrical contacts belonging to the various cutoff blocks of the switchgear 2.

The switchgear 2 also includes at least one filtering device 50 whose role is to cool and decontaminate the extinguishing gases and to reduce the pressure thereof before they are evacuated out of the switchgear 2.

Figure 3:
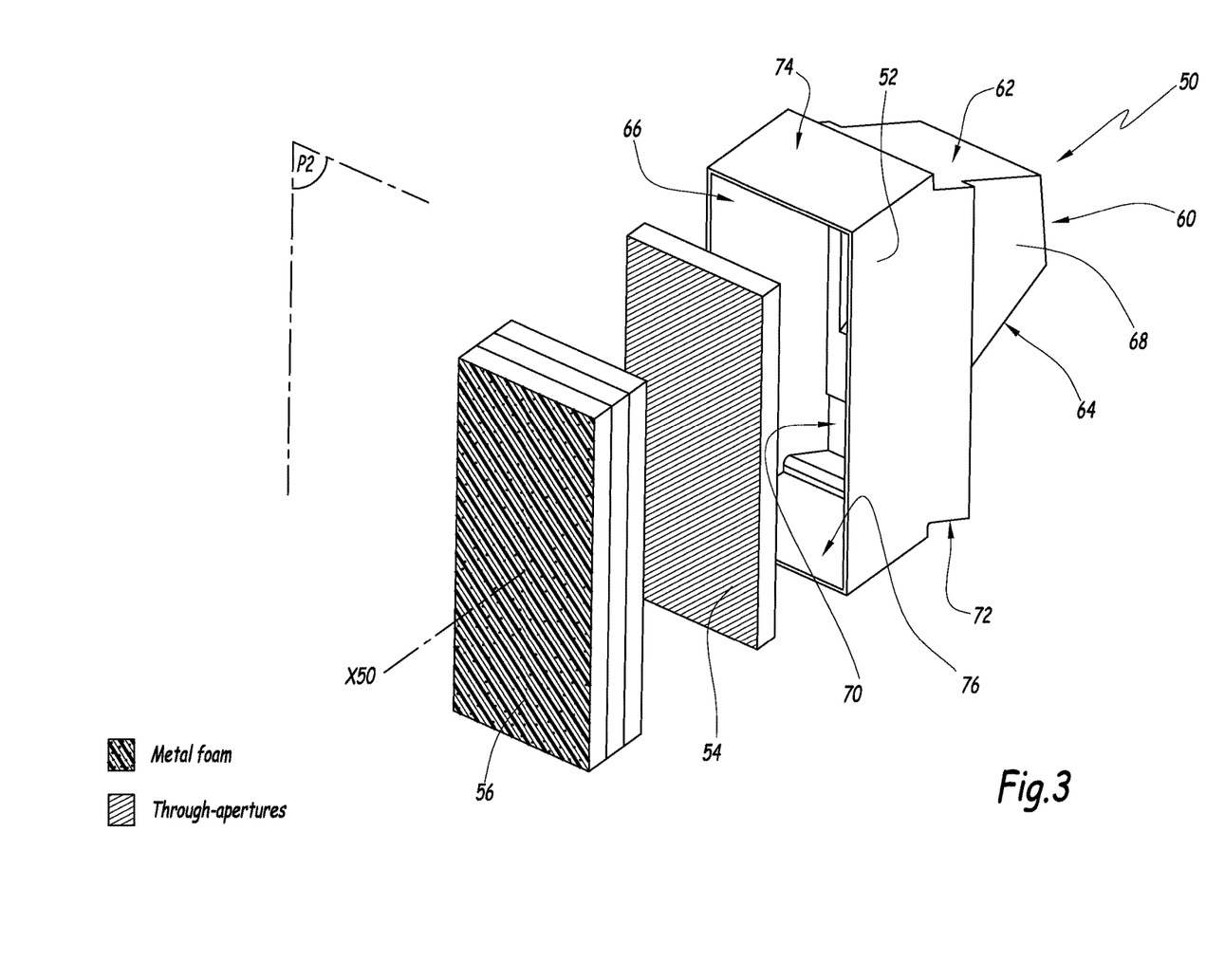
FIG. 3 is a schematic depiction, in an exploded view, of an extinguishing gas filtering device of the switchgear of FIG. 1.

As illustrated in FIG. 3, the filtering device 50 includes an inlet part 52, a gas diffuser 54 and a filter made of metal foam 56. In FIG. 3, these elements are illustrated in an exploded view so as to facilitate understanding. However, in practice, these elements are assembled together so as to form the filtering device 50. 'X50' is used to denote a longitudinal axis of the filtering device 50, and 'P2' is used to denote a transverse geometrical plane of the filtering device 50.

For example, the inlet part 52, the gas diffuser 54 and the filter 56 are assembled and aligned with one another along the axis X50.

In this example, each cutoff block of the switchgear 2 includes two filtering devices 50, each placed at the output of an extinguishing chamber 24, 24' of this cutoff block, that is to say in this case at the outlet of the corresponding evacuation channel 30, 30', so as to collect and filter the extinguishing gases coming from this cutoff block. As a variant, when the cutoff blocks include a different number of extinguishing gas outlet apertures, the number of filtering devices 50 is changed as a result, so that each extinguishing gas outlet aperture is provided with a filtering device 50.

In FIG. 1, the two filtering devices 50 associated with the cutoff block described above bear the references 50*a* and 50*b*, respectively, so as to differentiate them in the following description. In this example, the filtering device 50*a* is placed at the outlet of the extinguishing chamber 24, and the filtering device 50*b* is placed at the outlet of the extinguishing chamber 24'. More precisely, the devices 50*a* and 50*b* are placed at the outlet of the evacuation channels 30 and 30', respectively.

The inlet part 52 is in this case made of a metal material, preferably of nickel-coated steel. The metal material may be different, however, and for example be stainless steel.

The inlet part 52 includes an inlet aperture 60, termed main aperture. This inlet aperture 60 is intended to be connected fluidically to an extinguishing gas outlet of the switchgear 2, preferably in a sealtight manner, so as to allow extinguishing gases to pass from the gas outlet to inside the filtering device 50.

'Connected fluidically' is understood to mean in this case that elements are connected to one another so as to allow a fluid, such as a gas, to flow, preferably in a sealtight manner, that is to say limiting leakages out of these elements at the points where they are connected.

The inlet part 52 also includes an outlet aperture 66. The inlet part 52 also includes inlet walls 62, 64 that in this case extend from the inlet aperture 60 to the outlet aperture 66.

The inlet aperture 60 has dimensions smaller than those of the outlet aperture 66. For example, the surface area of the inlet aperture 60 does not exceed that of the extinguishing gas aperture with which it is associated. By limiting the dimensions of the orifice, the risk of the electric arc being able to escape out of the extinguishing chamber 24, 24' towards the filtering device 50 is reduced, thereby limiting the risk of the electric current looping back outside the switchgear 2.

The walls 62, 64 in this case have a flared form that widens from the inlet aperture 60 towards the outlet aperture 66.

In this example, the walls 62 and 64 partly define a first portion 68 of the part 52, this first portion 68 having a flared form, like a funnel, that in this case widens along the axis X50 and ends in a first orifice with a surface area greater than that of the inlet orifice 60. This first orifice is in this case positioned facing the outlet aperture 66 and opens out into this outlet aperture 66. This first orifice in this case has dimensions smaller than those of the outlet aperture 66. In this case, the first portion 68 extends parallel to the axis X50. As a variant, the first portion 68 may have a different form, for example a conical form.

Furthermore, the inlet part 52 optionally includes a secondary inlet aperture 70, also called additional inlet aperture. In the example illustrated, the additional aperture 70 is formed underneath the first portion 68. The part 52 also includes an inclined wall 72 that extends from the additional aperture 70 towards the outlet aperture 60.

The position and the dimensions of the inlet aperture 60 and, where applicable, of the additional aperture 70 are chosen depending on the form and on the location of the extinguishing gas escape outlets, as explained hereinafter.

The flared form of the walls 62, 64, and therefore of the first portion 68, and also the inclined form of the wall 72, play a part in deflecting and orienting the jet of extinguishing gas towards the gas diffuser 54 when said jet penetrates into the inlet part 52.

The inlet part 52 also has a second portion, partly defined by walls 74, 76 and by planar lateral walls that are not referenced. The second portion is formed in the extension of the first portion 68. The lateral walls in this case extend from the first portion and from the secondary aperture 70 as far as to the outlet aperture 66.

In this example, on account of the design of the switchgear 2, the extinguishing chambers 24 and 24' and the escape channels 30, 30' are positioned differently and asymmetrically. The evacuation channels 30, 30' therefore open out at different positions on opposite faces of the housing 8. For example, the channel 30 opens out outside the housing 8 at an escape outlet situated essentially in the middle of the upper face, and the channel 30' opens out outside the housing 8 at an escape outlet situated at an edge of the lower face, in particular due to the presence of the tripping device 44 that prevents it from opening out in the middle of the lower face.

The additional inlet aperture 70 is in this case intended to be connected fluidically to the output of the channel 30', whereas the inlet aperture 60 is in this case intended to be connected fluidically to the output of the channel 30. In this case, the additional aperture of the filtering device 50a opens out at a portion of the housing 8 and does not receive extinguishing gas. Analogously, the inlet aperture 60 of the filtering device 50b opens out at a wall of the housing 8 and does not receive extinguishing gas.

Thus, one and the same filtering device 50 model may be associated with gas outlets placed at different locations on the switchgear 2 that have different orientations and/or geometries. It is therefore not necessary, within one and the same switchgear 2, to resort to filtering devices having different geometries. This therefore simplifies manufacture of the switchgear 2 on an industrial scale, both in terms of cost and in terms of managing the parts necessary for manufacture.

As a variant, the part 52 may be different. In particular, the secondary inlet aperture 70 may be omitted. This is the case for example when the cutoff block of the switchgear 2 contains just one extinguishing chamber 24. The number and the form of the walls 62, 64 may also be different.

According to other variants, filtering devices 50a and 50b that are different from one another may be used within the switchgear 2, each for example adjusted to the position and/or to the form of the extinguishing gas outlets. Here again, the secondary inlet aperture 70 may be omitted when the inlet part 52 is adjusted to the form and to the position of the extinguishing gas outlet.

The role of the diffuser 54 is to promote the distribution of the flow of extinguishing gas entering the part 52 over the entire inlet surface area of the filter 56, in particular so as to prevent the jet of gas from being concentrated completely on a precise zone of the filter 56, which could damage it.

Preferably, the diffuser 54 includes a layer, or membrane, of wire cloth formed by weaving metal strands. These metal strands preferably have a large thickness, for example have a diameter greater than 1 mm. Advantageously, the cloth has a 'weave'-type mesh.

This layer of cloth has a planar form and in this case extends parallel to the plane P2 in the outlet aperture 66 over the entire surface area of the cross section of the outlet aperture 66. Thus, the entering jet of gas has to pass through the diffuser 54 in order to reach the filter 56. The woven-together wires thus define between them a plurality of through-apertures that allow the extinguishing gas to pass through the wire cloth membrane by travelling therethrough. For example, the layer of cloth is stretched between the walls 74 and 76 of the inlet part 52.

Advantageously, the wire cloth is in this case made of stainless steel, preferably of 'AISI 316L' type, with weft strands having a diameter greater than or equal to 1.4 mm and warp strands having a diameter greater than or equal to 2 mm, preferably with a weave having a plain weave structure.

As a variant, the metal weave cloth may be produced differently, for example with different strand diameters and/or a different weave structure. The strands forming the cloth may be made of a stainless steel of 'AISI 304L' type.

According to another embodiment, the diffuser 54 includes an assembly of metal plates or sheets that are perforated with apertures. These plates are positioned in the outlet aperture 66 so as to cover the outlet aperture 66. They perform a role analogous to the wire cloth described above. For example, these metal plates are positioned parallel to one another, in this case along the plane P2, and are spaced apart from one another along the axis X50. Preferably, the perforations are formed on these plates so as to be positioned in a manner offset with respect to the perforations of the immediately adjacent plates, that is to say that these perforations are not situated facing the perforations of the immediately adjacent plates and are not aligned with these perforations of the immediately adjacent plates. This prevents the jet of extinguishing gas from passing through the diffuser 54 in a straight line and, by contrast, promotes the travel and the spatial distribution of the extinguishing gas through the diffuser 54.

The filter 56 includes a layer of porous metal foam, placed at the output of the gas diffuser 54, for example by being coupled to the latter and covering an outlet face thereof over the entire surface area thereof. As a variant, the filter 56 includes a stack of a plurality of such layers of metal foam that are coupled to one another. For example, the layer(s) of metal foam are positioned parallel to the plane P2 between the walls 74 and 76 of the inlet part 52. Preferably, the layer(s) of foam are assembled in a sealtight manner, in order to prevent the extinguishing gas coming from the diffuser 54 from being able to escape out of the filtering device 50 without passing through the filter 56.

This metal foam has a high porosity, for example greater than or equal to 90% and, preferably, greater than or equal to 95%. Porosity is defined in this case as being the ratio between the volume of the empty space contained inside a volume of foam, on the one hand, and said volume of foam, on the other hand.

The metal foam has a porous alveolar structure formed of a solid metal material. In fact, it has a high exchange surface area, for example greater than or equal to 1500 m² per cubic metre of foam and, preferably, greater than or equal to 2500 m² per cubic metre or, even more preferably, greater than or equal to 2800 m² per cubic metre.

The pores of the metal foam open out outside the layer of foam, for example at outer faces of this layer. Thus, the extinguishing gases leaving the diffuser 54 are able to enter the layer 56 and pass therethrough so as then to emerge from it outside the filtering device 50.

Preferably, the metal foam is made of nickel. As a variant, the foam 56 may be made of a nickel-chromium alloy.

The combination of the inlet part 52, the gas diffuser 54 and the filter 56 makes it possible to cool the extinguishing gas by absorbing a large amount of energy from the latter, while at the same time limiting the ablation of material by the extinguishing gas. Now, in known filtering devices, the pressure increase that is typically observed is for the most part caused by the ablation of material by the hot extinguishing gas, particularly when these devices are made of plastic. By limiting the ablation of material, the increase in the pressure that is typically observed in known devices is limited. Even when such an ablation occurs, the pressure increase is not as great, as the metal materials that are used are not as gasogenic as the plastic materials of known devices, that is to say that they release less gas when they are exposed to the hot extinguishing gas flow.

By virtue of the invention, the extinguishing gases leaving the filtering device 50 are cooled in a satisfactory manner, and the pressure thereof is lower in comparison with known filtering devices. For example, the inventors have determined that, in some cases, the pressure of the extinguishing gases is four times lower, or even five times lower, than the pressure of the extinguishing gases at the output of known filtering devices.

On account of the performance of the filtering device 50, the operation of the switchgear 2 is more secure. It is able to be used in a confined environment while limiting the risk of damaging its environment when the current is cut off.

Figure 4:
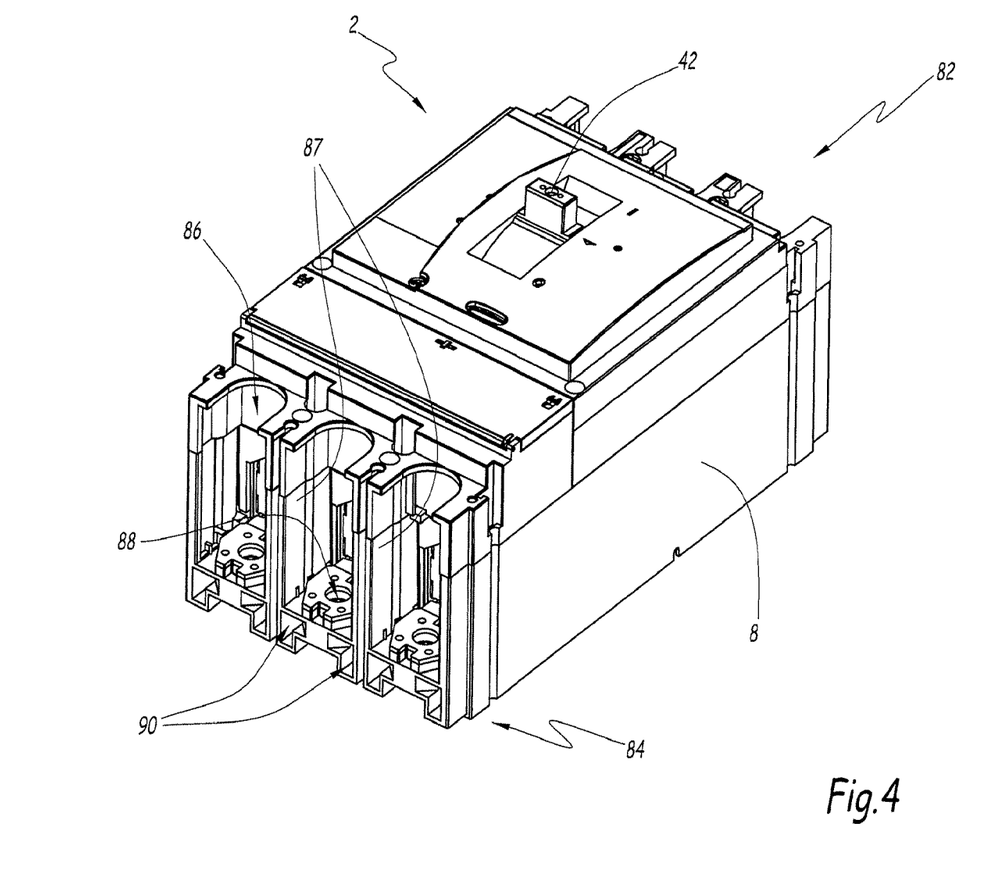
FIG. 4 is a schematic depiction of a housing of the switchgear of FIGS. 1 and 2, comprising connection zones for receiving the extinguishing gas filtering device of FIG. 3.

In this embodiment, as illustrated in FIGS. 2 and 4, the filtering devices 50 of the switchgear 2 are grouped within filtering assemblies 80, which each group together a plurality of filtering devices 50 associated with various cutoff blocks of the switchgear 2.

The extinguishing gas outlets of the switchgear 2 are in this case situated on an upper face of the housing 8 in an upper zone 82, and on a lower face of the housing 8 in a lower zone 84. The switchgear 2 therefore includes two filtering assemblies 80, one associated with the outputs placed in the zone 82 and fixed to the housing 8 in this zone 82, and the other associated with the outputs placed in the zone 84 and fixed to the housing 8 in this zone 84.

The filtering assemblies 80 are in this case identical and each include three filtering devices 50 that are preferably identical to one another.

As illustrated in FIG. 4, the lower zone 84 includes three recesses 86, or cavities, each formed at the base of the housing 8 in the alignment of one of the cutoff blocks. The recesses 86 are separated from one another by separating walls 87 that are in this case vertical and extend perpendicularly to the lower face, in this case parallel to the plane P1. These separating walls 87 are in this case formed contiguously with the housing 8.

Each of these recesses 86 also encloses a connection interface 88 for receiving one end of a connection terminal 6, 6', 6". Each interface 88 is in this case provided with a bore, which is for example tapped, intended to receive a fastening screw that holds the corresponding terminal 6, 6', 6" end. This interface 86 furthermore includes a plastic casing on which the bore is formed and that surrounds an extension of the fixed contact 14. Thus, when the terminal 6, 6', 6" is received in the corresponding interface 88, it is in electrical contact with this extension of the fixed contact 14.

The zone 84 also includes apertures 90 that are linked to the channel 30' and that together form an outlet for the extinguishing gases coming from the extinguishing chamber 24'. The apertures 90 are in this case placed at a rear edge of the zone 84.

These apertures 90, and also the channel 30' that extends as far as these apertures 90, are separated from the bore formed on the interface 86 and from the fixed contact 14 by electrically insulating internal walls of the housing 8 that are sealtight with respect to the extinguishing gas. In this way, the extinguishing gases are able to leave the housing 8 through this outlet without otherwise coming into electrical contact with the connection terminals 6, 6', 6". A risk of the current looping back within the switchgear 2 is thus prevented.

The assembly 80 furthermore includes a separating part 92 that is assembled on the lower face in the zone 84. This part 92 includes in particular separating walls 94 that extend the separating walls 87, thus defining recesses in the extension of the recesses 86. The part 92 also includes a cover 96, applied to its front face so as to mask and protect the recesses 86.

A filtering device 50 is received in each of these recesses. The inlet part 52 of each of these filtering devices 50 is pressed flat against the base of the housing 8 in the zone 84 so as to be positioned such that the secondary inlet aperture 70 is placed facing the corresponding apertures 90.

The upper zone 82 is produced analogously, if only in this case, and the interfaces 88 allow the connection of the terminals 4, 4' and 4". Furthermore, the evacuation channel 30 in this case has a geometry different from that of the evacuation channel 30' and opens out at a location separate and remote from the interface 86. The part 52 of each of the filtering devices 50 is pressed flat against the base of the housing 8 in the zone 82 so as to be positioned such that the main inlet aperture 60 is placed facing the outlet of the evacuation channel 30. The apertures 90 may then be omitted.

The embodiments and the variants contemplated above may be combined with one another so as to create new embodiments.

The invention claimed is:

1. An extinguishing gas filtering device for an electric current switchgear with separable contacts and including an electric arc extinguishing chamber, said extinguishing gas filtering device comprising:
    an inlet part for extinguishing gases, said inlet part being made of a metal material and including:
        an inlet aperture fluidically connected with an extinguishing gas outlet of the electric current switchgear,
        an outlet aperture, and
        at least one flared wall extending between the inlet and outlet apertures;
    a gas diffuser, which covers the outlet aperture of the inlet part, said gas diffuser being planar in shape and including through-apertures; and a filter made of porous metal foam and placed at an output of the gas diffuser.

2. The filtering device according to claim 1, wherein the inlet part includes an additional inlet aperture that is intended to be connected fluidically to an output of an extinguishing chamber, at least one of the walls of the inlet part extending from said additional inlet aperture to the outlet aperture.

3. The filtering device according to claim 1, wherein the gas diffuser includes a membrane of wire cloth.

4. The filtering device according to claim 3, wherein the wire cloth membrane is a weave cloth made of stainless steel formed by weaving metal strands with a diameter greater than or equal to 1 mm.

5. The filtering device according to claim 1, wherein the gas diffuser includes an assembly of perforated metal plates.

6. The filtering device according to claim 1, wherein the metal foam of the filter has a porosity greater than or equal to 90%.

7. The filtering device according to claim 1, wherein the metal foam of the filter is made of nickel or of nickel-chromium alloy.

8. The filtering device according to claim 1, wherein the inlet part is made of stainless steel or of nickel-plated steel.

9. An electric current switchgear, said switchgear comprising:
a cutoff block containing:
separable electrical contacts connected to input and output terminals for an electric current, and
an electric arc extinguishing chamber for extinguishing an electric arc and formed upon the separation of the separable electrical contacts, said extinguishing chamber being linked fluidically to an extinguishing gas outlet of the switchgear;
an extinguishing gas filtering device connected fluidically to the extinguishing gas outlet,
wherein the extinguishing gas filtering device includes:
an inlet part for the extinguishing gases, said inlet part being made of a metal material and including:
an inlet aperture intended to be fluidically connected with an extinguishing gas outlet of an electric current switchgear,
an outlet aperture, and
at least one flared wall extending between the inlet and outlet apertures;
a gas diffuser, which covers the outlet aperture of the inlet part, said gas diffuser being planar in shape and comprising through-apertures; and
a filter made of porous metal foam, placed at the output of the gas diffuser.

10. The switchgear according to claim 9, wherein the cutoff block comprises a second extinguishing chamber comprising a second extinguishing gas outlet, the switchgear comprising a second filtering device positioned at an output of a second outlet, extinguishing gas filtering device and the second filtering device being identical to one another, the inlet aperture of said second filtering device being connected fluidically to said extinguishing gas outlet, the additional inlet aperture of the second filtering device being connected fluidically to said second extinguishing gas outlet.

* * * * *

UNITED STATES PATENT AND TRADEMARK OFFICE
CERTIFICATE OF CORRECTION

PATENT NO. : 10,522,310 B2
APPLICATION NO. : 16/038741
DATED : December 31, 2019
INVENTOR(S) : Marc Rival et al.

It is certified that error appears in the above-identified patent and that said Letters Patent is hereby corrected as shown below:

In the Claims

In Column 12, Line 24 (approx.), Claim 10, after "outlet," insert --the--.

Signed and Sealed this
Twentieth Day of October, 2020

Andrei Iancu
*Director of the United States Patent and Trademark Office*